US008040986B2

(12) United States Patent
Polley et al.

(10) Patent No.: US 8,040,986 B2
(45) Date of Patent: Oct. 18, 2011

(54) FREQUENCY-DOMAIN SUBCHANNEL TRANSMIT ANTENNA SELECTION AND POWER POURING FOR MULTI-ANTENNA TRANSMISSION

(75) Inventors: Michael O. Polley, Garland, TX (US); Donald P. Shaver, Dallas, TX (US); Srinath Hosur, Plano, TX (US); Eko Onggosanusi, Allen, TX (US); Muhammad Z. Ikram, Richardson, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1849 days.

(21) Appl. No.: 10/723,215

(22) Filed: Nov. 26, 2003

(65) Prior Publication Data

US 2005/0113041 A1 May 26, 2005

(51) Int. Cl.
 *H04B 7/10* (2006.01)
 *H04L 1/02* (2006.01)
(52) U.S. Cl. ........ 375/347; 375/348; 375/349; 375/350; 375/267
(58) Field of Classification Search .................. 375/347, 375/348, 333, 346, 299, 297, 148, 136, 133, 375/147, 291, 285, 267, 232, 233, 350, 231; 714/781, 758, 767, 782
See application file for complete search history.

(56) References Cited

U.S. PATENT DOCUMENTS

| 4,063,174 A | * | 12/1977 | Gupta et al. | 375/267 |
| 5,465,271 A | * | 11/1995 | Hladik et al. | 375/267 |
| 5,710,995 A | * | 1/1998 | Akaiwa et al. | 455/277.2 |
| 6,118,773 A | * | 9/2000 | Todd | 370/334 |
| 6,144,711 A | * | 11/2000 | Raleigh et al. | 375/347 |
| 6,201,955 B1 | * | 3/2001 | Jasper et al. | 455/277.2 |
| 7,366,247 B2 | * | 4/2008 | Kim et al. | 375/267 |
| 2004/0032910 A1 | * | 2/2004 | Horng et al. | 375/267 |
| 2004/0184570 A1 | * | 9/2004 | Thomas et al. | 375/346 |
| 2005/0047517 A1 | * | 3/2005 | Georgios et al. | 375/267 |
| 2005/0053170 A1 | * | 3/2005 | Catreux et al. | 375/267 |
| 2005/0201477 A1 | * | 9/2005 | Cho et al. | 375/260 |
| 2006/0109926 A1 | * | 5/2006 | Jalali et al. | 375/260 |
| 2007/0173277 A1 | * | 7/2007 | Yun | 455/522 |

OTHER PUBLICATIONS

Benyassine, A.; Akansu, A.N., "Optimal subchannel structuring and basis selection for discrete multicarrier modulation", IEEE, Global Telecommunications Conference, Nov. 13-17, 1995, pp. 97-101.*
Jian Yang; Roy, S.; "On joint transmitter and receiver optimization for multiple-input-multiple-output (MIMO) transmission systems", IEEE, Transactions on Communications, vol. 42, Issue 12, Dec. 1994, p. 3221-3231.*

* cited by examiner

*Primary Examiner* — Chieh M Fan
*Assistant Examiner* — Qutbuddin Ghulamali
(74) *Attorney, Agent, or Firm* — Steven A. Shaw; W. James Brady; Frederick J. Telecky, Jr.

(57) ABSTRACT

A system comprises a wireless device that communicates across a spectrum having a plurality of sub-channels. The wireless device comprises a plurality of antennas through which the wireless device communicates with another wireless device, wherein each antenna communicates with the other wireless device via an associated communication pathway. The wireless device further comprises sub-channel power analysis logic coupled to the antennas and adapted to determine which communication pathway has the highest communication quality on a sub-channel by sub-channel basis. The wireless device still further comprises diversity selection logic coupled to the sub-channel power analysis logic and adapted to determine a weighting vector for an associated antenna based on the communication quality, wherein the weighting vector specifies a relative transmission power for each sub-channel for the associated antenna.

21 Claims, 3 Drawing Sheets

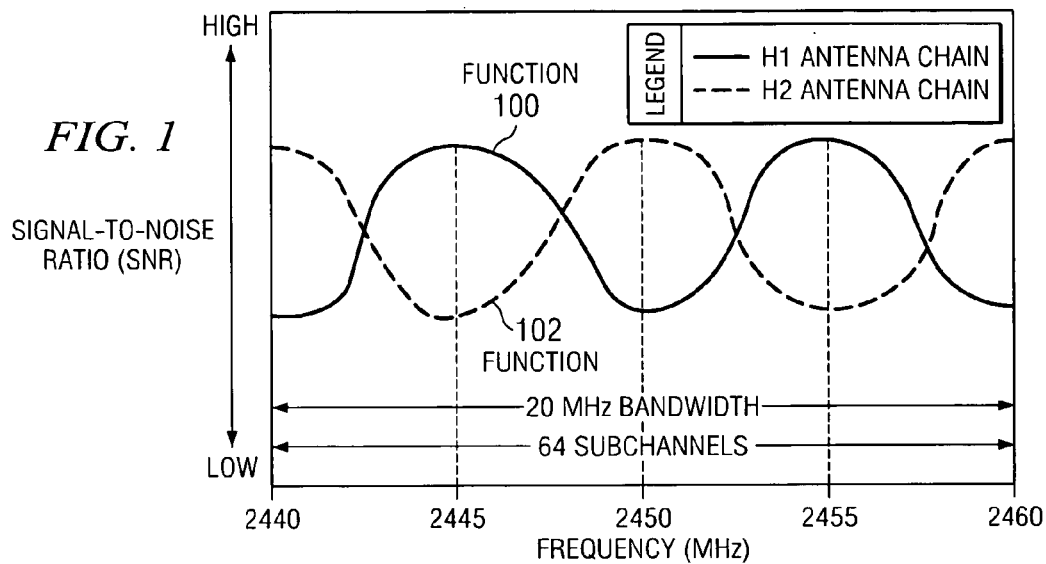
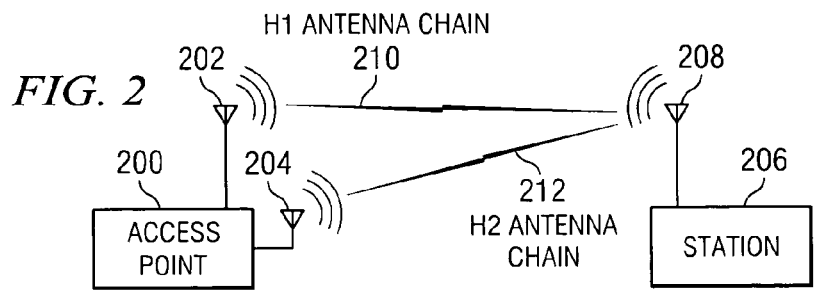
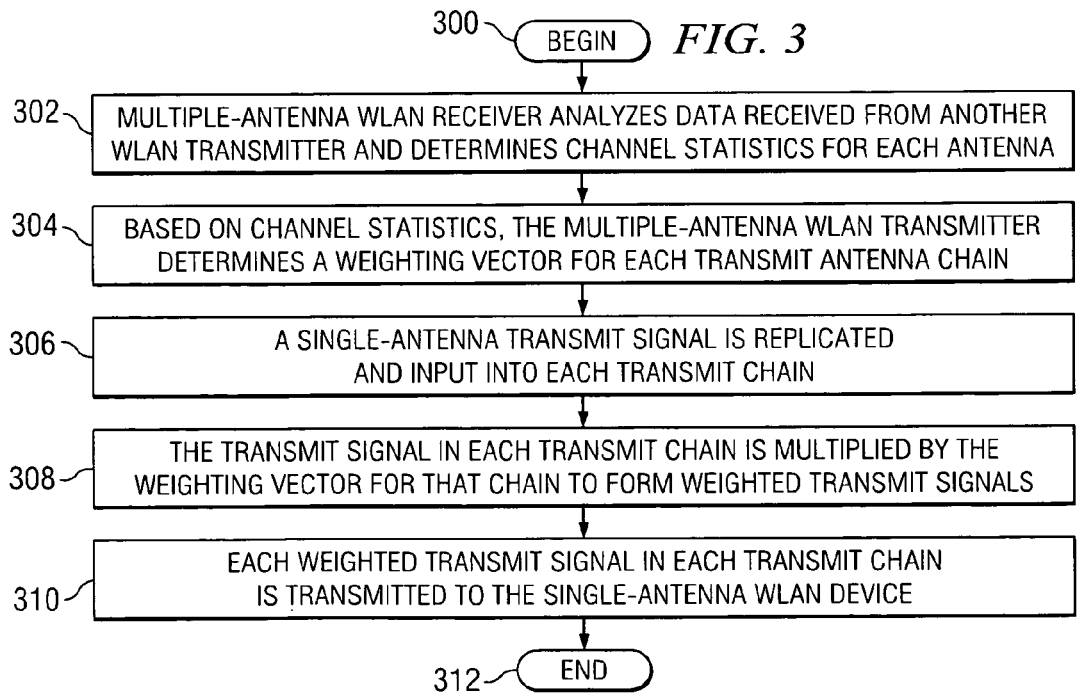

FREQUENCY-DOMAIN SUBCHANNEL TRANSMIT ANTENNA SELECTION AND POWER POURING FOR MULTI-ANTENNA TRANSMISSION

BACKGROUND

This invention generally relates to wireless networks and specifically to wireless local area network ("WLAN") devices.

Wireless local area networks ("WLAN") allow network devices, such as computers, to have network connectivity without the use of wires. Network connections may be established via, for example, radio signals. A wireless access point ("AP") may comprise a wired Internet or Ethernet connection and a radio communication circuitry capable of transmitting data to and receiving data from another compatible wireless device. The AP may provide Internet and/or network connectivity to such other network devices (e.g., computer) called stations ("STA") by transmitting and receiving data via radio signals.

A variety of industry standards exist that govern the implementation of WLANs. Examples of such industry standards comprise the IEEE 802.11a, 802.11b and 802.11g protocols. The 802.11a and 802.11g protocols utilize the Orthogonal Frequency-Division Multiplexing (OFDM) communication method where the data to be transmitted is split into multiple parallel data streams and each parallel data stream transmitted simultaneously over narrow sub-channels that togther form the full channel bandwidth of 20 MHz. The 802.11b protocol utilizes the direct sequence spread spectrum ("DSSS") communication method. DSSS enables communication between two devices by splitting into several parts each byte of data to be transmitted and sending each part concurrently on different frequencies across a 24 MHz-wide spectrum.

In many WLANs, each wireless device (AP or STA) has a single signal path for transmission, a single signal path for reception, and a single antenna. Some WLAN devices may have multiple antennas, but only a single signal path for reception and a single signal path for transmission; the most favorable antenna may be connected to transmit and receive signal chains through a switch (a technique known as antenna switched diversity). In the following, a single-antenna transceiver is defined as a transceiver that has a single signal path for reception and a single signal path for transmission. A single-antenna transceiver also may be defined as a transceiver with multiple antenna structures that may be selectively connected to the signal paths with a control switch. A multi-antenna transceiver is defined as a device having multiple transmission signal paths and multiple receive signal paths in addition to a plurality of radio structures that may be connected to the signal paths. The performance of such WLAN systems is determined by data rates achieved between an AP WLAN transceiver and any STA WLAN transceivers communicating with the AP. There exist a wide range of possible operating conditions between an AP and each STA associated with the AP. Typically, the maximum achievable data rates between the AP and a given STA decrease as the distance between the AP and the STA increases.

The rate at which data is transferred ("data rate") between an AP and each STA associated with the AP may be raised by increasing the number of antennas associated with each wireless device in the system. For instance, a system comprising an AP with multiple antennas and an STA with multiple antennas may have a higher data rate than a system comprising an AP with a single antenna and an STA with a single antenna. The multiple-input antennas and multiple-output antennas ("MIMO") are part of a design that attempts to achieve a linear increase in data rate as the number of transmitting and receiving antennas linearly increase.

WLAN systems employ MIMO "space-time" coding, wherein a transmission signal is split in the time domain and the signal is distributed across the multiple transmitting antennas in space. When combined with a multi-carrier modulating scheme, such as Orthogonal Frequency Data Modulation ("OFDM"), the encoding technique is referred to as "space-time-frequency" coding. A multiple-antenna receiver may receive and process a space-time encoded signal or a space-time-frequency encoded signal to determine the data transmitted from each transmitting antenna.

A multiple-antenna WLAN transmitter (e.g., an AP) produces a set of signals that each pass through separate signal paths for digital modulation, analog and radio frequency processing and wireless transmission over the antennas. These paths are determined largely by the various positions of the transmitting and receiving antennas. Some paths may be at a disadvantage to other paths due to undesirable factors, such as signal noise. Paths that have less interference and greater signal clarity are said to have a relatively high signal-to-noise ratio ("SNR"). Thus, paths with greater SNRs are preferred over paths with lesser SNRs.

Since single-antenna WLAN devices (e.g. STAs) are not compatible with multiple-antenna WLAN devices, systems solely comprising single-antenna WLAN devices cannot take advantage of the vast improvement in performance realized by systems solely comprising multiple-antenna WLAN devices. A performance-improving technique for a multiple-antenna WLAN device communicating with a single-antenna WLAN device is desirable.

BRIEF SUMMARY

In accordance with at least some embodiments, a system comprises a wireless device that communicates across a spectrum having a plurality of sub-channels. The wireless device comprises a plurality of antennas through which the wireless device communicates with another wireless device, wherein each antenna communicates with the other wireless device via an associated communication pathway. The wireless device further comprises sub-channel power analysis logic coupled to the antennas and adapted to determine which communication pathway to the other wireless device has the highest communication quality on a sub-channel by sub-channel basis. The wireless device still further comprises diversity selection logic coupled to the sub-channel power analysis logic and adapted to determine a weighting vector for an associated antenna based on the communication quality, wherein the weighting vector specifies a relative transmission power for each sub-channel for the associated antenna.

BRIEF DESCRIPTION OF THE DRAWINGS

For a detailed description of the embodiments of the invention, reference will now be made to the accompanying drawings in which:

FIG. 1 illustrates a graph of frequency vs. signal-to-noise ratio (SNR) performance of two antenna chains;

FIG. 2 illustrates a block diagram of two WLAN devices communicating in accordance with a preferred embodiment of the invention;

FIG. 3 illustrates a flow diagram in accordance with a preferred embodiment of the invention;

NOTATION AND NOMENCLATURE

Figure 4:
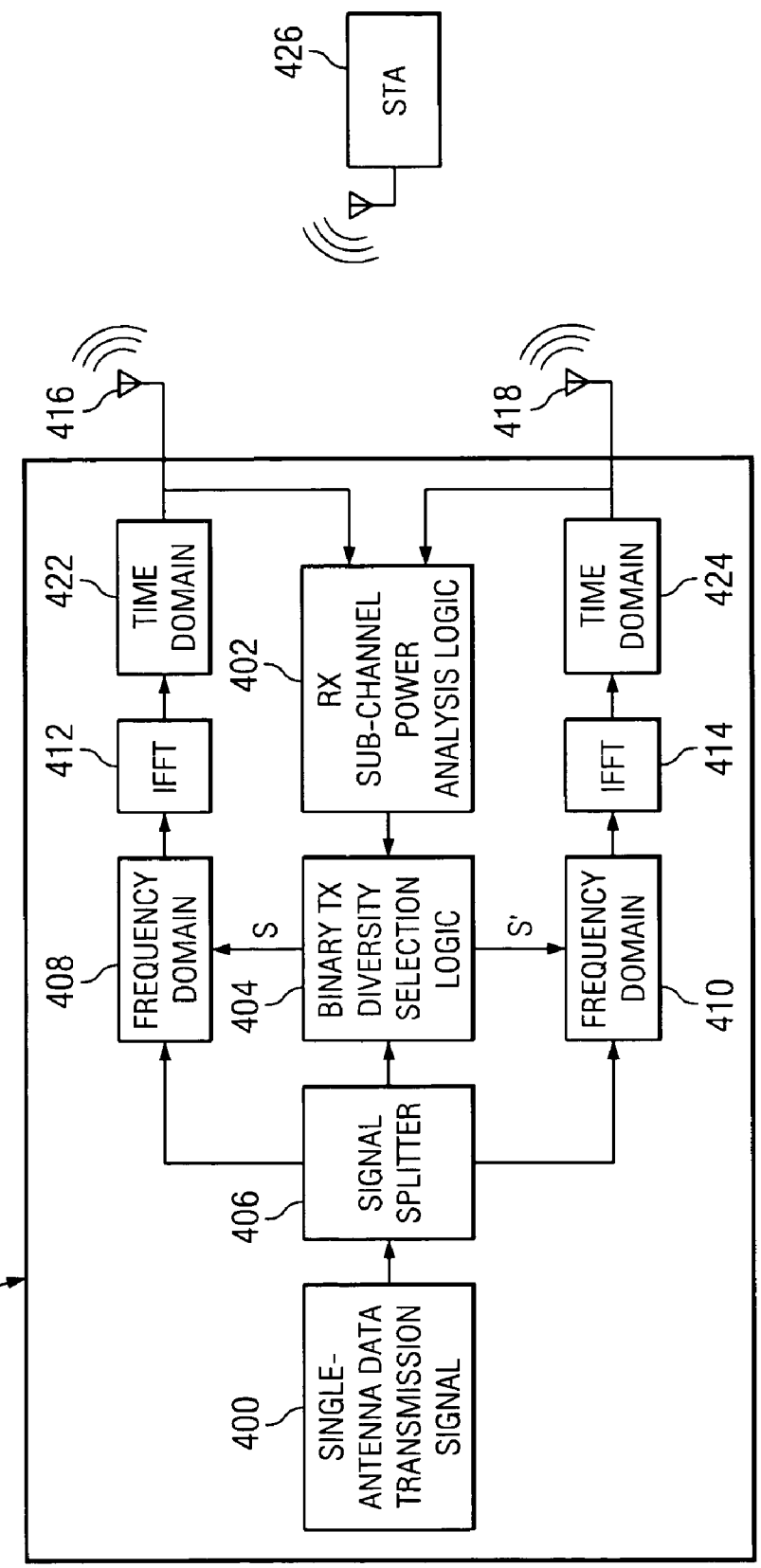
FIG. 4 illustrates a block diagram of an access point and station in accordance with a preferred embodiment of the invention.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed below provides a technique for enabling a multiple-antenna WLAN device to achieve performance improvements when communicating with a single-antenna WLAN device or when communicating with a multiple-antenna WLAN device operating in a single-antenna mode. The embodiments described herein may be provided in the context of an IEEE 802.11 compliant device, but other wireless protocols, now known or later developed, may be used as well.

In accordance with the preferred embodiment, a power pouring technique is described herein that is applied on a frequency-by-frequency basis. Referring now to FIGS. 1 and 2, FIG. 1 illustrates an exemplary relationship between SNR and frequency for two antenna chains in a system having two transmitting antennas and one receiving antenna, as illustrated in FIG. 2. An antenna chain may be defined as the communication pathway between an antenna 202, 204 on a multiple-antenna WLAN device (e.g. AP 200) and an antenna 208 on a single-antenna WLAN device (e.g. STA 206). Function 100 on FIG. 1 represents the SNR versus frequency relationship of the H1 antenna chain 210 formed between antenna 202 on AP 200 and antenna 208 on STA 206. Function 102 represents the SNR versus frequency relationship of the H2 antenna chain 212 formed between antenna 204 on AP 200 and antenna 208 on STA 206. As illustrated in the example of FIG. 1, the width of the frequency band of the system in FIG. 2 is 20 MHz, between 2440 MHz and 2460 MHz. The 20 MHz bandwidth may be subdivided into 64 sub-channels of which 48 sub-channels may be used to transfer data. At a frequency of 2445 MHz, the SNR of the H1 antenna chain is greater than the SNR of the H2 antenna chain, thereby making the H1 antenna chain the desirable channel for data transfer at 2445 MHz. Similarly, at a frequency of 2450 MHz, the SNR of the H2 antenna chain is greater than the SNR of the H1 antenna chain, placing the H2 antenna chain at an advantage over the H1 antenna chain for data transmission at 2450 MHz.

Still referring to FIG. 1, a "spectral null" may be defined as a portion of function 100 or a portion of function 102 wherein the SNR of the function is not the highest possible SNR for a particular frequency. For example, a spectral null is present in function 100 at a frequency of 2450 MHz, since the SNR of function 102 is greater than the SNR of function 100 at 2450 MHz. Similarly, another spectral null is present in function 102 at a frequency of 2445 MHz, since the SNR of function 100 is greater than the SNR of function 102 at 2445 MHz. It is undesirable to transmit data of a particular sub-channel through an antenna chain not having the maximum possible SNR (i.e., at a spectral null).

In accordance with the preferred embodiments of the invention and as explained in greater detail below, a multiple-antenna wireless device such as an AP determines the relative communication quality over the various antenna chains on a sub-channel by sub-channel basis. In some embodiments, SNR may be used to indicate the relative communication quality of various antenna chains. The AP determines which of its antennas provides the highest SNR on each sub-channel and configures the communication so that communications from that point on use the antenna corresponding to the highest SNR.

The power pouring method described herein improves performance of a single-antenna receiver by negating the effect of spectral nulls. In accordance with the preferred embodiments, the multiple-antenna WLAN negates spectral nulls by determining for each sub-channel which of the two antenna chains would produce the signal of highest quality and exclusively transmitting data via that antenna chain. Negating the spectral nulls for all available sub-channels allows the multiple-antenna WLAN to consistently transmit data through the antenna chain having the maximum possible SNR for a given sub-channel, thereby providing optimal data transmission quality at all times. Since only one antenna chain transmits the data in any given sub-channel, the composite signal emitted from the two transmit antennas appears to a single-antenna receiver as a signal emitted from a single-transmit antenna. Thus, the subject matter disclosed herein enables multiple-antenna WLAN devices to be compatible with single-antenna WLAN devices while providing for efficient data transfer and substantial performance gains. The concept may be extended to applying the power pouring method across sub-channels in order to normalize power across the band to achieve a particular frame error rate (i.e., a particular level of receiver performance).

FIG. 3 illustrates a flow diagram of a technique for enabling a multiple-antenna WLAN device (e.g. AP) to achieve performance improvements when communicating with a single-antenna WLAN device (e.g. STA) or when communicating with a multiple-antenna WLAN device operating in a single-antenna mode. The process may begin with a multiple-antenna WLAN receiver analyzing data received from another WLAN transmitter and determining channel statistics for each antenna (block 302). Channel statistics comprise the received power level in each sub-channel for each antenna, interference levels and any other information relevant to the performance of the channel for each antenna. The purpose of determining the channel statistics for each antenna in the multiple-antenna device is to ascertain which antenna provides a greater SNR for each sub-channel. As explained below, it is desirable for the multiple-antenna WLAN device to regularly estimate channel statistics for each antenna chain, allowing for optimal performance at any given time. The system may be configured to acquire the channel statistics of each antenna chain at some programmable interval.

Channel statistics may be obtained from sources comprising the preamble of a data packet sent from the single-antenna WLAN device to the multiple-antenna WLAN device. The preamble may contain information useful to the multiple-antenna WLAN device, such as data necessary to determine the SNR for each antenna chain in each sub-channel. For example, AP 200 of FIG. 2 with antennas 202, 204, an STA with antenna 208 and 48 sub-channels comprising the system bandwidth may have data packets sent and received between the two devices. Each data packet may comprise a preamble and a data payload. A received preamble may be analyzed to determine SNR data for the H1 antenna chain 210 between antennas 202, 208 for all 48 data sub-channels. The received preamble may be analyzed to determine SNR data for the H2 antenna chain 212 between antennas 204, 208 for all 48 data sub-channels. The AP 200 then may step through the 48 data sub-channels and determine which antenna chain possesses the highest SNR value for each sub-channel. As explained below, weighting vectors may be determined by AP 200, allowing the data for each sub-channel to be sent through the antenna chain with the highest SNR for that sub-channel.

Based on the channel statistics, the multiple-antenna WLAN device determines a suitable weighting vector for each transmit antenna chain (block 304). An exemplary weighting vector technique comprises a binary numbering system. Such a vector preferably comprises a "1" or a "0" for each sub-channel. An antenna chain weighting vector comprising a "1" for a particular chain's sub-channel may indicate that that chain is the preferred antenna chain for data transmission in the sub-channel (i.e., no other antenna chain has a higher SNR for the given sub-channel). Similarly, an antenna chain weighting vector comprising a "0" for a different sub-channel may indicate that that chain is not the preferred antenna chain for data transmission in the sub-channel (i.e., another chain has a higher SNR for the given sub-channel). Thus, for any given sub-channel, the weighting vector of an antenna having the highest SNR may be assigned a 1 to indicate that that chain is the preferred antenna for data transmission. Further, for the same sub-channel, the weighting vectors for all other antennas are assigned a 0 to indicate that not one of the antennas is the preferred antenna for data transmission. Thus, at least in some embodiments, only one antenna chain is used to transmit the data in any given sub-channel.

Referring to FIG. 2 for an example, the AP 200 has two transmitting antennas 202, 204 and one receiving antenna 208 on STA 206. For a simplified example of an OFDM system, assume we have a relatively narrow bandwidth comprising 4 sub-channels (note that OFDM WLAN actually has 64 sub-channels, of which 48 are used for data and 4 are used for pilots). Based on the channel conditions during operation, we may determine that the H1 antenna chain 210 between antennas 202, 208 has a greater SNR for the first two sub-channels. Similarly, the AP 200 may determine that the H2 antenna chain 212 between antennas 204, 208 has a greater SNR for the second two sub-channels. Accordingly, the AP 200 may compute a weighting vector S for antenna 202, such as [1 1 0 0]. The 1's in the first two positions in weighting vector S designate antenna 202 as the transmitting antenna of choice for the first and second sub-channels, respectively. The 0's in the last two positions in weighting vector S prevent antenna 202 from transmitting data in the third and fourth sub-channels, respectively. Similarly, a corresponding weighting vector S' for antenna 204 may be determined, such as [0 0 1 1]. The 0's in the first two positions in weighting vector S' prevent antenna 204 from transmitting data in the first and second sub-channels. The 1's in the last two positions in weighting vector S' designate antenna 204 as the transmitting antenna for data in the third and fourth sub-channels. Thus, weighting vectors S and S' may be the complement of each other (S is orthogonal to S').

In a preferred embodiment, one method for determining weighting vectors comprises distributing data in a particular sub-channel to multiple antennas at a programmable ratio based on the amount of time elapsed since the most recent channel statistics were acquired. The format used in representing such weighting vectors may be referred to as a "proportional format" or a "ratio format." The AP 200 of FIG. 2 having two transmitting antennas 202, 204 may transmit the data in a particular sub-channel through both antennas 202, 204 to a receiving antenna 208 on STA 206. The following example applies to an individual sub-channel and applies as well for all other sub-channels.

The AP 200 may be transmitting data packets at intervals of 100 ms and receiving channel statistics at intervals of 500 ms. At time t=0 ms, AP 200 may receive and analyze a set of channel statistics and determine that H1 antenna chain 210 has a higher SNR than H2 antenna chain 212. Thus, the AP 200 pours 100% of available power into H1 antenna chain 210 and pours 0% of the available power into H2 antenna chain 212. At time t=100 ms, another data packet is ready to be transmitted to antenna 208. However, 100 ms have elapsed since the most recent channel statistics were received. The channel statistics may no longer be accurate or valid; that is, the SNR of H1 antenna chain 210 may not necessarily be greater than the SNR of H2 antenna chain 212. Thus, in accordance with a preferred embodiment, AP 200 may pour 80% of available power into H1 antenna chain 210 and pour 20% of available power into H2 antenna chain 212. At time t=400 ms, yet another data packet is ready to be transmitted to antenna 208. A total of 400 ms have elapsed since the most recent channel statistics were received. The likelihood may be even lower that the channel statistics are still accurate and/or valid. Thus, AP 200 may pour 50% of the available power into H1 antenna chain 210 and pour 50% of available power into H2 antenna chain 212, thereby increasing the likelihood of optimal quality data transmission. At t=500 ms, AP 200 receives and analyzes a new and accurate set of channel statistics. AP 200 determines the SNR of H2 antenna chain 212 to be greater than the SNR of H1 antenna chain 210. Thus, AP 200 pours 100% of available power into H2 antenna chain 212 and pours 0% of available power into H1 antenna chain 210 and repeats the process described above for subsequently transmitted data packets. Moreover, AP 200 may distribute the data in a sub-channel between multiple antennas at any of a variety of ratios. Another method for determining weighting vectors comprises distributing data in a particular sub-channel to multiple antennas at a programmable ratio based on the number of data packets sent since the most recent channel statistics were acquired. The scope of disclosure is not limited solely to the methods for creating weighting vectors described herein. Any one of a variety of methods for determining weighting vectors may be employed.

Referring again to FIG. 3, once the weighting vectors have been determined, a single-antenna transmit signal is replicated or otherwise generated (to permit the AP to communicate with a single antenna enabled device) and input into each transmit chain (block 306). The transmit signal in each transmit antenna chain is then multiplied by, or otherwise combined with, the weighting vector for that antenna chain to form weighted transmit signals (block 308). Each weighted transmit signal in each transmit antenna chain is concurrently transmitted to the single-antenna WLAN device (block 310).

The power pouring technique of the present invention is performed on a sub-channel-by-sub-channel basis and the transmit signal is transmitted from both antennas. The techniques described herein account for the spectral nulls present in each antenna chain by evaluating the SNR for each antenna in each sub-channel and creating a weighting vector for each antenna, thereby eliminating the spectral nulls and improving performance.

Referring now to FIG. 4, a block diagram is shown detailing an exemplary embodiment of an AP in context of, for example, a 2-antenna 802.11a-protocol or 802.11g-protocol transceiver. A particular single-antenna 802.11a-protocol or 802.11g-protocol STA 426 transmits an OFDM signal over the air and AP 420 receives the signal through antennas 416, 418. For each sub-channel, sub-channel power analysis logic 402 determines which of the antenna chains has the highest SNR and creates the appropriate weighting vectors S and S' at binary transmission diversity selection logic 404 for use in transmission of data to the STA 426. The frequency-domain representation of the single-antenna transmission signal 400 is duplicated by signal splitter 406 on AP 420 for use as input to the two different transmit antenna chains. The weighting vectors S and S' are multiplied by each of the frequency-domain signals 408, 410 in each of the antenna chains to produce two weighted transmit vectors. An IFFT is performed by inverse Fourier transformers 412, 414 on each weighted transmit vector, producing two separate transmit time-domain signals 422, 424. Time-domain signals 422, 424 subsequently are sent via two antenna chains and two antennas 416, 418 to the STA 426. The composite signal emitted from the two transmit antennas 416, 418 appears to the STA 426 as a signal emitted from a single transmit antenna.

Figure 5:
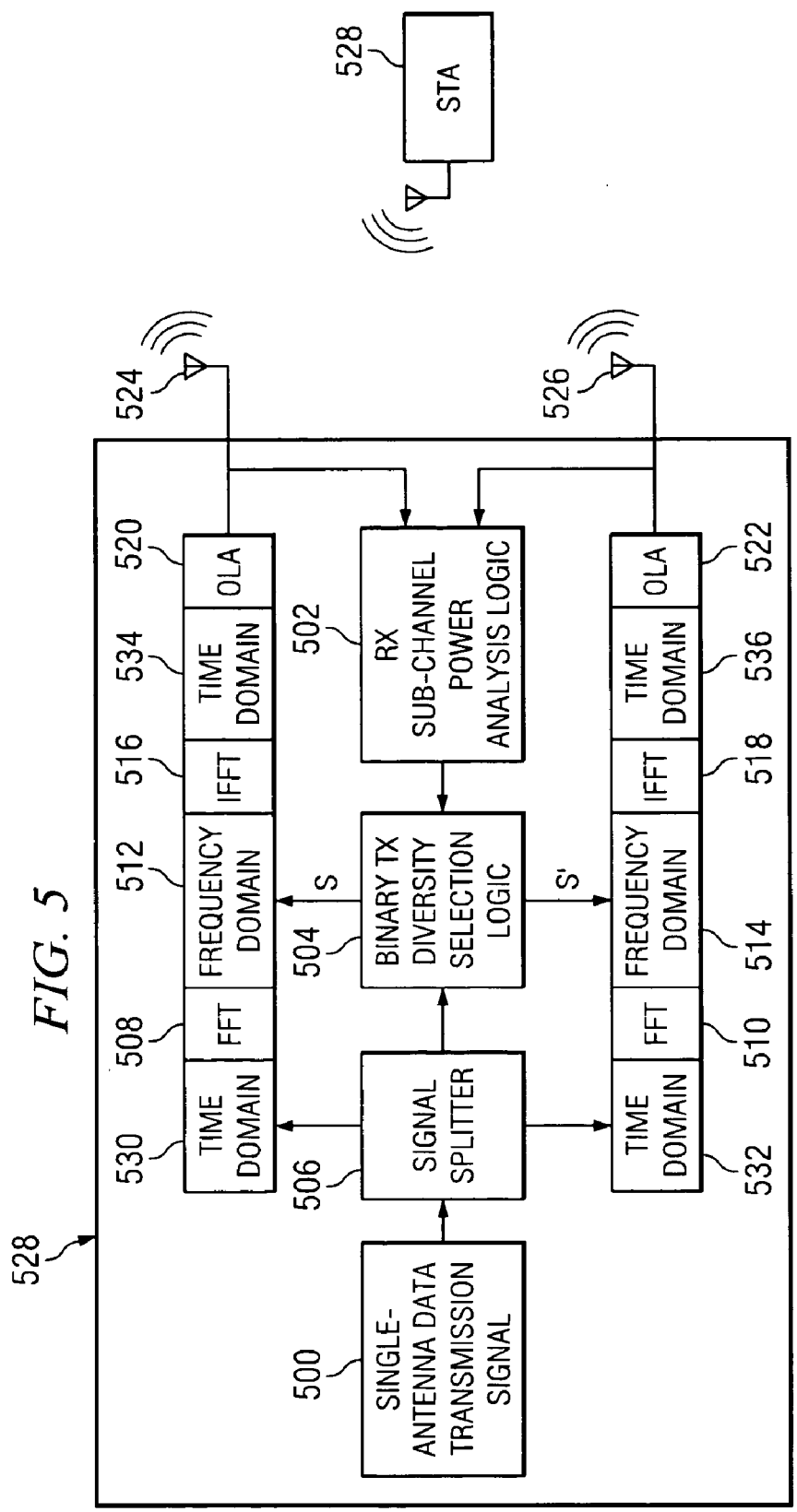
FIG. 5 illustrates an alternative block diagram of an access point and station.

Another embodiment of an AP in context of a 2-antenna 802.11b-protocol transceiver 528 is shown in FIG. 5. A particular single-antenna 802.11b-protocol STA 538 transmits a signal over the air and AP 528 captures the signal through antennas 524, 526. The received 802.11b signal is analyzed on a sub-channel basis to determine its received power levels for each antenna. Any choice of sub-channel bandwidth may be employed for this analysis, since the OFDM sub-channel restrictions of 802.11a and 802.11g presently are not applicable. For each sub-channel, sub-channel power analysis logic 502 determines which of the antenna chains has the highest SNR and binary transmission diversity selection logic 504 creates the appropriate weighting vectors S and S' for use in transmission of data to the STA 538. Single-antenna transmission signal 500 is duplicated by signal splitter 506 on AP 528 for use as input to the two different transmit antenna chains. Fourier transformers 508, 510 transform time-domain signals 530, 532 into frequency domain signals 512, 514 using a fast Fourier transform ("FFT"). Weighting vectors S and S' are applied to frequency-domain signals 512, 514. Inverse Fourier transformers 516, 518 then transform each frequency-domain signal 512, 514 back to the time-domain with IFFT to produce time domain signals 534, 536, respectively. Overlap-add devices 520, 522 apply overlap-add ("OLA") techniques to smooth the time-domain effective filter response. Each time-domain signal 534, 536 is transmitted over transmit antennas 524, 526. The composite signal emitted from transmit antennas 524, 526 appears to the STA 538 as a signal emitted from a single transmit antenna.

The performance-improving techniques disclosed herein may be applied to a system comprising one multiple-antenna WLAN device and one single-antenna WLAN device, or one multiple-antenna WLAN device and a plurality of single-antenna WLAN devices, or a plurality of multiple-antenna WLAN devices and a plurality of single-antenna WLAN devices.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multiple-antenna wireless device that communicates with a single-antenna enabled device across a spectrum having a plurality of sub-channels, said multiple-antenna wireless device comprising:

a plurality of antennas through which the multiple-antenna wireless device communicates with the single-antenna enabled device wireless device, each antenna of the plurality of antennas communicates with the single-antenna enabled device wireless device via an associated communication pathway between a subset of the plurality of antennas on the multiple-antenna wireless device and an antenna on the single-antenna enabled device;

sub-channel power analysis logic coupled to the plurality of antennas and adapted to determine a communication quality for at least two communication pathways and determine which communication pathway has a highest communication quality on a sub-channel by sub-channel basis; and diversity selection logic coupled to the sub-channel power analysis logic and adapted to determine an antenna chain weighting vector for an associated antenna chain based on the highest communication quality, wherein the antenna chain weighting vector specifies a relative transmission power for each sub-channel for the associated antenna chain, wherein the antenna chain weighting vector for the associated antenna comprises a plurality of bits, each bit corresponding to one sub-channel, and each bit indicating whether the associated antenna is used to transmit on the corresponding sub-channel.

2. The device of claim 1, wherein the antenna chain weighting vector represented in a proportional format comprises a plurality of values, each value corresponding to a sub-channel and each value being indicative of an amount of power to be provided to the associated antenna chain.

3. The device of claim 2, wherein the amount of power to be provided to an antenna is determined by the number of signal transmissions since the communication quality for each sub-channel of the associated communication pathway was most recently determined.

4. The device of claim 2, wherein the amount of power to be provided to an antenna is based on the communication quality of each sub-channel in the associated communication pathway.

5. The device of claim 2, wherein the amount of power to be provided to an antenna is determined by the amount of time elapsed since the communication quality for each sub-channel of the associated communication pathway was most recently determined.

6. The device of claim 1, wherein the wireless device may wirelessly communicate with a plurality of wireless stations.

7. The device of claim 1, further comprising a signal splitter coupled to the diversity selection logic and adapted to reproduce signals to be transmitted.

8. A method for a multiple-antenna device communicating with a single-antenna wireless enabled device, comprising:

receiving data transmitted from the single-antenna enabled wireless device to a second wireless device using a plurality of antennas at the second wireless device, wherein each antenna of the plurality of antennas communicates with the single-antenna enabled wireless device via an associated communication pathway transmit antenna chain;

determining a plurality of channel characteristics associated with each antenna of the plurality of antennas;

replicating a single antenna transmit signal in order to permit the second wireless device to communicate with the single-antenna enabled wireless device;

on a per sub-channel basis, computing an antenna chain weighting vector for each antenna chain for each sub-channel based on the plurality of channel characteristics, comprising:

representing the antenna chain weighting vector using a plurality of bits, each bit corresponding to an antenna chain in a different sub-channel, and the each bit indicating whther an antenna chain associated with the weighting vector is used to transmit data on the corresponding sub-channel;

for each communication pathway, combining a transmission signal in each transmit antenna chain with the antenna chain weighting vector for that antenna chain to form plurality of a weighted transmission signals; and concurrently transmitting to the single-antenna enabled device each the weighted transmission signal in each transmit antenna chain from the second wireless device to the single antenna enabled wireless device via a plurality of communication pathways.

9. The method of claim 8, wherein the single-antenna enabled wireless device transmits data to a plurality of wireless devices and receives data from a plurality of wireless devices.

10. The method of claim 8, wherein each antenna chain weighting vector specifies a relative transmission power for the antenna chain for each sub-channel.

11. The method of claim 8, wherein channel characteristics comprise a signal-to-noise ratio.

12. A method for a multiple-antenna device communicating with a single-antenna enabled device, comprising:

receiving data transmitted from the single-antenna enabled wireless device to a second wireless device using a plurality of antennas at the second wireless device, wherein each antenna of the plurality of antennas communicates with the single-antenna enabled wireless device via an associated communication pathway;

determining a plurality of channel characteristics associated with each antenna chain in each sub-channel;

representing an antenna chain weighting vector in a ratio format;

wherein the ratio format specifies the amount of power to be applied to the antenna chain antenna chain associated with the antenna chain weighting vector for the antenna chain for each sub-channel; wherein the antenna chain weighting vector for the associated antenna comprises a plurality of bits, each bit corresponding to one sub-channel, and each bit indicating whether the associated antenna is used to transmit on the corresponding sub-channel;

for each communication pathway, combining a transmission signal in each transmit antenna chain with the antenna chain weighting vector to form a plurality of weighted transmission signals; and concurrently transmitting to the single-antenna enabled device each of the weighted transmission signals in the each transmit antenna chain from the second wireless device to the single antenna enabled wireless device via a plurality of communication pathways.

13. The method of claim 12, wherein specifying the amount of power to be applied to the antenna chain is based on the communication quality of each antenna chain for each sub-channel.

14. The method of claim 13, wherein specifying the amount of power to be applied to the each transmit antenna chain is further based on the number of data transmissions since the communication quality of the antenna chain for a given sub channel was most recently determined.

15. The method of claim 13, wherein specifying the amount of power to be applied to the each transmit antenna chain is further based on the amount of time elapsed since the communication quality of the antenna chain for a given sub channel was most recently determined.

16. A system, comprising:

an access point having a plurality of antennas; and a wireless station in communication with the access point via a single antenna in the wireless station;

wherein the plurality of antennas in the access point receive a data signal from the single antenna in the wireless station via a plurality of communication pathways, each of the communication pathway comprising a plurality of sub-channels;

wherein the access point determines channel characteristics and a antenna chain weighting vector for each of the antenna of the plurality of antennas, each antenna chain weighting vector being indicative of an amount of power to be provided to each sub-channel for an associated antenna chain; wherein the antenna chain weighting vector for the associated antenna comprises a plurality of bits, each bit corresponding to one sub-channel, and each bit indicating whether the associated antenna is used to transmit on the corresponding sub-channel;

wherein the access point reproduces a data transmission signal, combines each copy of the data transmission signal with a different antenna chain weighting vector to produce a plurality of weighted transmission signals, and transmits each of the weighted transmission signal to the wireless station via a separate communication pathway.

17. The system of claim 16, wherein the antenna chain weighting vector comprises a plurality of values, each value corresponding to a sub-channel and each value being representative of an amount of power to be applied to an antenna associated with the antenna chain weighting vector.

18. The system of claim 17, wherein the amount of power to be applied to a particular antenna for a particular sub-channel is based on the number of data transmissions since the quality of the associated communication pathway was last determined; and wherein the amount of power to be provided to a particular antenna for a particular sub-channel is further based on the signal-to-noise ratio associated with that antenna.

19. The system of claim 17, wherein the amount of power to be applied to a particular antenna for a particular sub-channel is based on the amount of time elapsed since the quality of the associated communication pathway was last determined; and wherein the amount of power to be provided to a particular antenna for a particular sub-channel is further based on the signal-to-noise ratio associated with that antenna.

20. A method for a multiple-antenna device communicating with a single-antenna enabled device, said method comprising:

for each of a plurality of antennas, determining a communication quality of each sub-channel of a communication pathway, the communication pathway comprising a plurality of sub-channels;

for the each sub-channel, selecting an antenna chain from the plurality of antennas and providing power to each of the antenna chain of the plurality of antennas based on a number of data transmissions since the communication quality was most recently determined; and concurrently transmitting data via the plurality of antennas across the plurality of sub-channels via an antenna chain for a given sub channel.

21. A method for a multiple-antenna device communicating with a single-antenna enabled device, said method comprising:

for each of a plurality of antennas, determining a communication quality of each sub-channel of a communication pathway, the communication pathway comprising a plurality of sub-channels;

for the each sub-channel, selecting an antenna chain from the plurality of antennas and providing power to each of the antenna chain of the plurality of antennas based on time elapsed since the communication quality was most recently determined; and concurrently transmitting data via the plurality of antennas across the plurality of sub-channels via an antenna chain for a given sub channel.

* * * * *